(12) United States Patent
Brandt-Pearce et al.

(10) Patent No.: US 11,621,876 B2
(45) Date of Patent: Apr. 4, 2023

(54) CLIPPING-ENHANCED DATA COMMUNICATION

(71) Applicant: University of Virginia Patent Foundation, Charlottesville, VA (US)

(72) Inventors: Maite Brandt-Pearce, Free Union, VA (US); Jie Lian, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 221 days.

(21) Appl. No.: 17/053,533

(22) PCT Filed: May 9, 2019

(86) PCT No.: PCT/US2019/031497
§ 371 (c)(1),
(2) Date: Nov. 6, 2020

(87) PCT Pub. No.: WO2019/217664
PCT Pub. Date: Nov. 14, 2019

(65) Prior Publication Data
US 2021/0234742 A1     Jul. 29, 2021

Related U.S. Application Data

(60) Provisional application No. 62/668,879, filed on May 9, 2018.

(51) Int. Cl.
*H04B 10/00*     (2013.01)
*H04L 27/26*     (2006.01)
(Continued)

(52) U.S. Cl.
CPC ....... *H04L 27/2624* (2013.01); *H04B 10/556* (2013.01); *H04B 10/116* (2013.01)

(58) Field of Classification Search
CPC .............................. H04B 10/58; H04B 10/588
See application file for complete search history.

(56) References Cited

U.S. PATENT DOCUMENTS

| 4,338,950 A | 7/1982 | Barlow, Jr. et al. |
| 5,343,499 A | 8/1994 | Jasper et al. |

(Continued)

FOREIGN PATENT DOCUMENTS

XN     WO-2019217664 A1     11/2019

OTHER PUBLICATIONS

"International Application Serial No. PCT/US2019/031497, International Search Report dated Jul. 29, 2019", 2 pgs.

(Continued)

*Primary Examiner* — Daniel G Dobson
(74) *Attorney, Agent, or Firm* — gman Lundberg & Woessner, P.A.

(57) ABSTRACT

A system and method for communication of digital data includes receiving a plurality of data bits to be transmitted, and generating an output signal for transmission by a transmitter circuit. The generating includes generating a portion of the output signal comprising values of the output signal with magnitude less than a specified threshold, the specified threshold corresponding to a specified transmitter circuit maximum output power; and generating a portion of the output signal comprising a representation of values of the output signal with magnitude greater than the specified threshold.

20 Claims, 5 Drawing Sheets

(51) Int. Cl.
*H04B 10/556* (2013.01)
*H04J 14/00* (2006.01)
*H04B 10/116* (2013.01)

(56) References Cited

U.S. PATENT DOCUMENTS

| | | | |
|---|---|---|---|
| 7,924,941 B2 | 4/2011 | Yu | |
| 7,978,985 B2 | 7/2011 | Zheng | |
| 2009/0135949 A1* | 5/2009 | Yu | H04L 27/2624 |
| | | | 375/296 |
| 2016/0226594 A1* | 8/2016 | Haas | H04B 10/516 |

OTHER PUBLICATIONS

"International Application Serial No. PCT/US2019/031497, Written Opinion dated Jul. 29, 2019", 7 pgs.

Lian, Jie, "Indoor visible light communications, networking, and applications", J. Phys.: Photonics 1 (2019) 012001, (Jan. 15, 2019), 29 pgs.

"International Application Serial No. PCT/US2019/031497, International Preliminary Report on Patentability dated Nov. 19, 2020", 9 pgs.

* cited by examiner

CLIPPING-ENHANCED DATA COMMUNICATION

PRIORITY APPLICATION

This application is a U.S. National Stage filing under 35 U.S.C. § 371 of PCT Patent Application No. PCT/US2019/031497, filed on May 9, 2019, which claims priority to U. S. Provisional Application Ser. No. 62/668,879, filed May 9, 2018, the disclosure of which are incorporated herein in their entireties by reference.

STATEMENT OF GOVERNMENT INTEREST

This invention was made with government support under Grant No. 1521387, awarded by National Science Foundation. The government has certain rights in the invention.

TECHNICAL FIELD

This document pertains generally, but not by way of limitation, to data communication, and particularly but not by way of limitation to accommodation of signal clipping in data transmissions.

BACKGROUND

Data communication systems, such as visible light communication (VLC) systems, can be used to transmit data between devices. VLC systems communicate data using optical energy, as compared to much longer wavelength radio-frequency energy, for example. In VLC systems, one or more light sources can be controlled to modulate an optical signal to communicate data from one device to another. The receiving device can include one or more sensors configured to sense the optical signal and provide the sensed data to a circuit to recover the communicated data.

SUMMARY

Orthogonal frequency domain multiplexing (OFDM) can be used in radio-frequency (RF) and other communication systems to modulate data onto orthogonal subcarriers in order transmit data high data rates while limiting inter-symbol-interference (ISI). However, the amount of data transmitted can be limited by power output limitations of transmission elements, such as RF amplifiers and light-emitting diodes (LEDs), for example. The present inventors have recognized, among other things, that it is desirable, in addition to transmitting the entirety of the output signal that is within the power limits of the transmission element, to transmit signals representative of information that has been clipped from the output signal due to the power output limitations in order to reduce signal distortion. By transmitting the clipped information, the modulation index can be increased without incurring significant signal distortion from clipping.

In an example, a method of communication of digital data includes receiving a plurality of data bits to be transmitted; and generating an output signal for transmission by a transmitter circuit. The generating includes generating a portion of the output signal comprising values of the output signal with magnitude less than a specified threshold, the specified threshold corresponding to a specified transmitter circuit maximum output power; and generating a portion of the output signal comprising a representation of values of the output signal with magnitude greater than the specified threshold.

In another example, a system for communication of digital data includes a transmitter circuit and a receiver. The transmitter circuit is configured to receive a plurality of data bits and generate an output signal for transmission. The transmitter circuit is further configured to generate a portion of the output signal comprising values of the output signal with magnitude less than a specified threshold, the specified threshold corresponding to a specified transmitter circuit maximum output power, and generate a portion of the output signal comprising a representation of values of the output signal with magnitude greater than the specified threshold. The receiver is configured to receive the output signal and generate the plurality of data bits from the output signal.

In another example, a transmitter configured to communicate digital data for a receiver includes a transmitting element, and a circuit configured to receive a plurality of data bits and generate an output signal for transmission. The circuit is further configured to generate a portion of the output signal comprising values of the output signal with magnitude less than a specified threshold, the specified threshold corresponding to a specified circuit maximum output power, and generate a portion of the output signal comprising a representation of values of the output signal with magnitude greater than the specified threshold.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A data communication system is disclosed herein that decreases signal distortion by transmitting information clipped due to power output limitations of a data transmitter. In an example, a visible light communication (VLC) system transmits orthogonal frequency-division multiplexing (OFDM) data optically using intensity modulation and direct detection (IM/DD). In other examples, rather than OFDM, other modulation formats may be used, and other transmission technologies, such as radio frequency (RF) may be used.

Because light from light-emitting diodes is generally incoherent, the transmitted signals need to be real and positive. To accommodate this, Hermitian symmetry can be used to ensure the values are real, and each transmission can transmit inverted values of the negative portion of the signal in a separate time slot to the positive portion. For example, a first time slot can be used to transmit all of the positive values for an OFDM transmission, and the second time slot can be used to transmit inverted values of the negative values of the data transmission. A third time slot (or more) can be used to transmit any data from the first and second time slots that is greater than a specified threshold, which can correspond to output power limitation of the transmitting element, such as a maximum output power of a light-emitting diode (LED), for example. The time slots can be transmitted in any order and in some examples, can be transmitted simultaneously using separate communication channels, for example.

Figure 1:
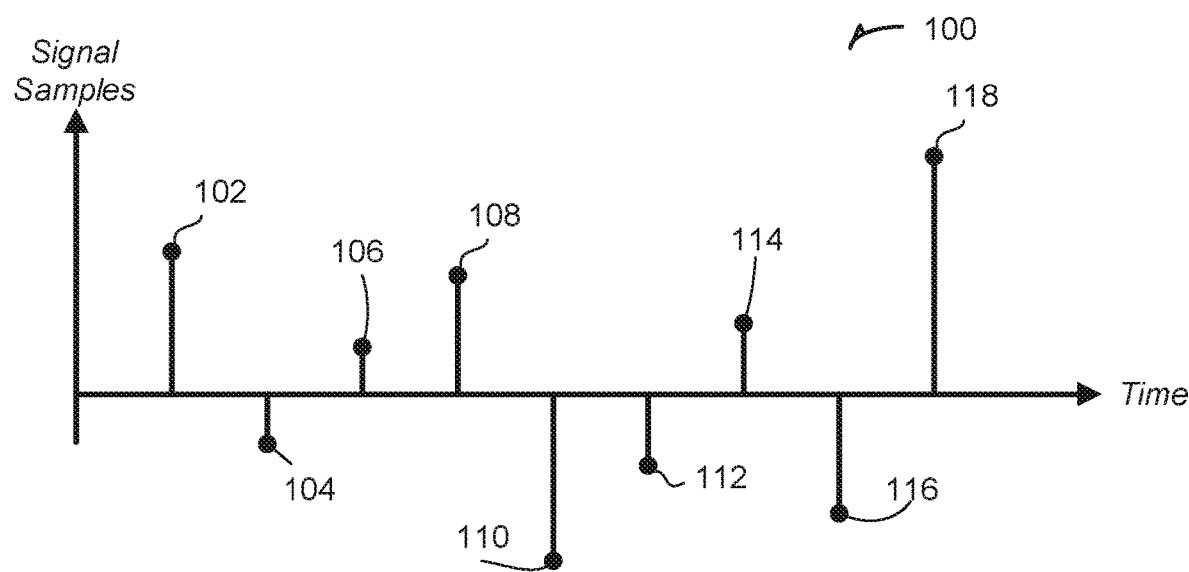
FIG. 1 is a chart illustrating an example bipolar orthogonal frequency division multiplexing (OFDM) signal.

FIG. 1 is a chart illustrating a bipolar OFDM data transmission 100. OFDM can be utilized to modulate data onto several orthogonal subcarriers within a larger frequency band. Each subcarrier can be modulated to include multiple bits using quadrature amplitude modulation (QAM) or any other modulating technique. Because the subcarriers are orthogonal, there is little to no inter-symbol interference (ISI), allowing high data rate transmissions that utilize the entire bandwidth.

The larger the modulation index used, the greater the potential amplitude of the final time-domain signal. Transmitting elements, such as RF amplifiers and LEDs, for example, can have power limitations that limit the amplitude of the transmitted signal. Thus, if the final time-domain signal includes values with magnitude greater than the power limits of the transmitting element, the signal gets clipped when transmitted, resulting in signal distortion. Many bits of data can be encoded into the data transmission 100.

The data transmission 100 illustrates one such time-domain output signal for an OFDM system. The data transmission 100 includes discrete signals 102, 104, 106, 108, 110, 112, 114, 116, and 118. To generate the signals 102-118, for example, quadrature amplitude modulation can be used to modulate digital data in the frequency domain (i.e., the digital data is encoded onto several sub-carriers). An inverse fast Fourier transform (IFFT) can then be used to convert the frequency domain signals into the discrete time domain signals illustrated in FIG. 1. If the QAM data is Hermitian symmetric, the time domain signal is real-valued. Data transmission 100 is bipolar in that signals 102, 106, 108, 114, and 118 are positive values of the data transmission and signals 104, 110, 112, and 116 are negative values of the data transmission.

In an example, a VLC system can implement several LEDs and several photodetectors to transmit and receive data within a space. In VLC systems, LEDs and other light sources that work as transmitters are generally incoherent and thus, can only transmit signals that are real and positive. Because of this, intensity modulation and direct detection (IM/DD) is used to transmit the data. To modulate the intensity, the LEDs can be driven by forward current signals. Due to the structure of the LED, the output optical power and the driving input current may be nonlinearly related. To linearize the relation between the output optical power and the input current, predistortion can be applied, for example.

However, outside the linearized range, current saturation can lead to a maximum output power ($P_{MAX}$) from the LED. Thus, any value with magnitude that is greater than a threshold that corresponds to $P_{MAX}$ must be clipped.

Clipped data can act like channel noise, causing signal distortion, which can be significant depending on the amplitude of the signals 102-118 of the data transmission. As seen in FIG. 1, several of the signals 102-118 are greater than the threshold corresponding to $P_{MAX}$, resulting in clipping of those signals when transmitted. To prevent signal distortion caused by clipping, the information for the signals with magnitude that lies outside the threshold can be transmitted as a separate transmission from the information for the signals with magnitude that lies within the threshold.

Figures 2A, 2B:
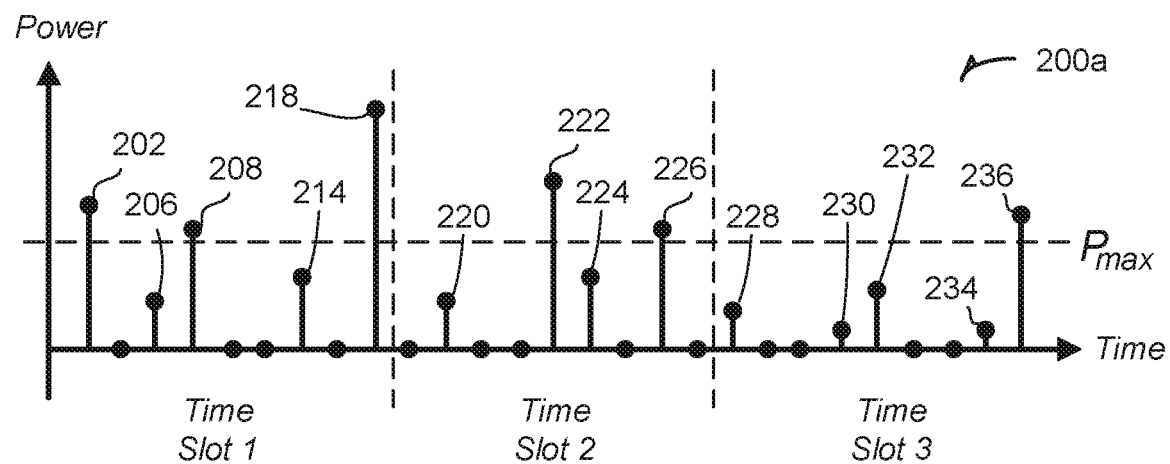
FIGS. 2A and 2B are charts illustrating signals for clipping-enhanced OFDM schemes.

FIGS. 2A and 2B are charts illustrating data transmissions for clipping-enhanced transmission schemes for the data transmission illustrated in FIG. 1. FIG. 2A illustrates a clipping-enhanced scheme that utilizes three time slots for a VLC system. For data transmission 200a, during time slot 1, all of the positive values of the data transmission 100 (102, 106, 108, 114, and 118) are transmitted as signals 202, 206, 208, 214, and 218. In the example illustrated in FIG. 2A, the light source used to transmit the data can only handle positive and real signals and thus cannot directly transmit the negative signals 104, 110, 112, and 116 of the data transmission 1. In an example, for the negative values of data transmission 100, nothing is transmitted during time slot 1. For example, a value of zero is transmitted between signals 202 and 206 for the negative signal 104 of the data transmission 100. Zero-values can be transmitted for each of the negative values during time slot 1.

During time slot 2, the inverted values of the negative values illustrated in FIG. 1 (104, 110, 112, 116) of the data transmission 100 are transmitted as positive signals 220, 222, 224, and 226 of equal magnitude. For the positive signal values of the data transmission 100, nothing is transmitted during time slot 2. For example, a value of zero is transmitted between signals 224 and 226 for the positive signal 114 of the data transmission 100. Zero-values can be transmitted for each of the positive values during time slot 2.

As seen in FIG. 2A, signals 202, 208, 218, 222, and 226 are all greater than the threshold $P_{MAX}$, which correspond to an output power limit of the transmitting element, such as an LED. This results in clipping of those signals, which can lead to signal distortion. To reduce signal distortion, a third time slot is used for the data transmission 200 during which the clipped portions (the signal portion above $P_{MAX}$) of each signal of the first two time slots are transmitted. Thus, the signals 228, 230, 232, 234, and 236 are transmitted to convey the clipped information of respective signals 202, 208, 222, 226, and 218. The receiver can use this information from time slot 3 to reconstruct the original time domain signal and obtain the original digital data.

Even with three time slots, some clipping may still occur, as can be seen with signal 236, which is still greater than the $P_{MAX}$ threshold. In systems with large modulation indexes, the amount of clipping in slot 3 can be significant. To accommodate clipping in slot 3, FIG. 2B illustrates a data transmission 200b that includes L time slots for transmitting clipped information. Time slots 1 and 2 of the data transmission 200b can be the same as the data transmission 200a in that time slot 1 transmits the positive portion of the data transmission and time slot 2 transmits the negative portion of the data transmission. Time slots 3 through L+2 transmit clipped information of the data transmission. For example, each time slot N can transmit clipped information from the time slot N−1. For example, for the data transmission 200a, the clipped portion of the signal 236 could be transmitted in a fourth time slot. The more times slots that are included, the greater the range of signals that can be supported without incurring signal distortion due to clipping.

In other examples, such as systems that transmit OFDM signals using RF, two time slots are not needed because there is no need to transmit the negative portion of the signal separately from the positive portion. Rather, a single timeslot can be used to transmit the entirety of the signal having magnitude less than the threshold value that corresponds to the peak power output of the amplifier driving the RF antenna. An additional time slot can then be used to transmit a representation of the portion of the signal having magnitude greater than the threshold value that corresponds to the peak power output of the amplifier driving the RF antenna. Any number of additional time slots may be used to transmit the clipped portion of the RF signal. The time slots used to transmit the clipped information can be transmitted prior to, subsequent to, or simultaneous to the time slot used to transmit the portion of the signal having magnitude less than the threshold.

Figure 3:
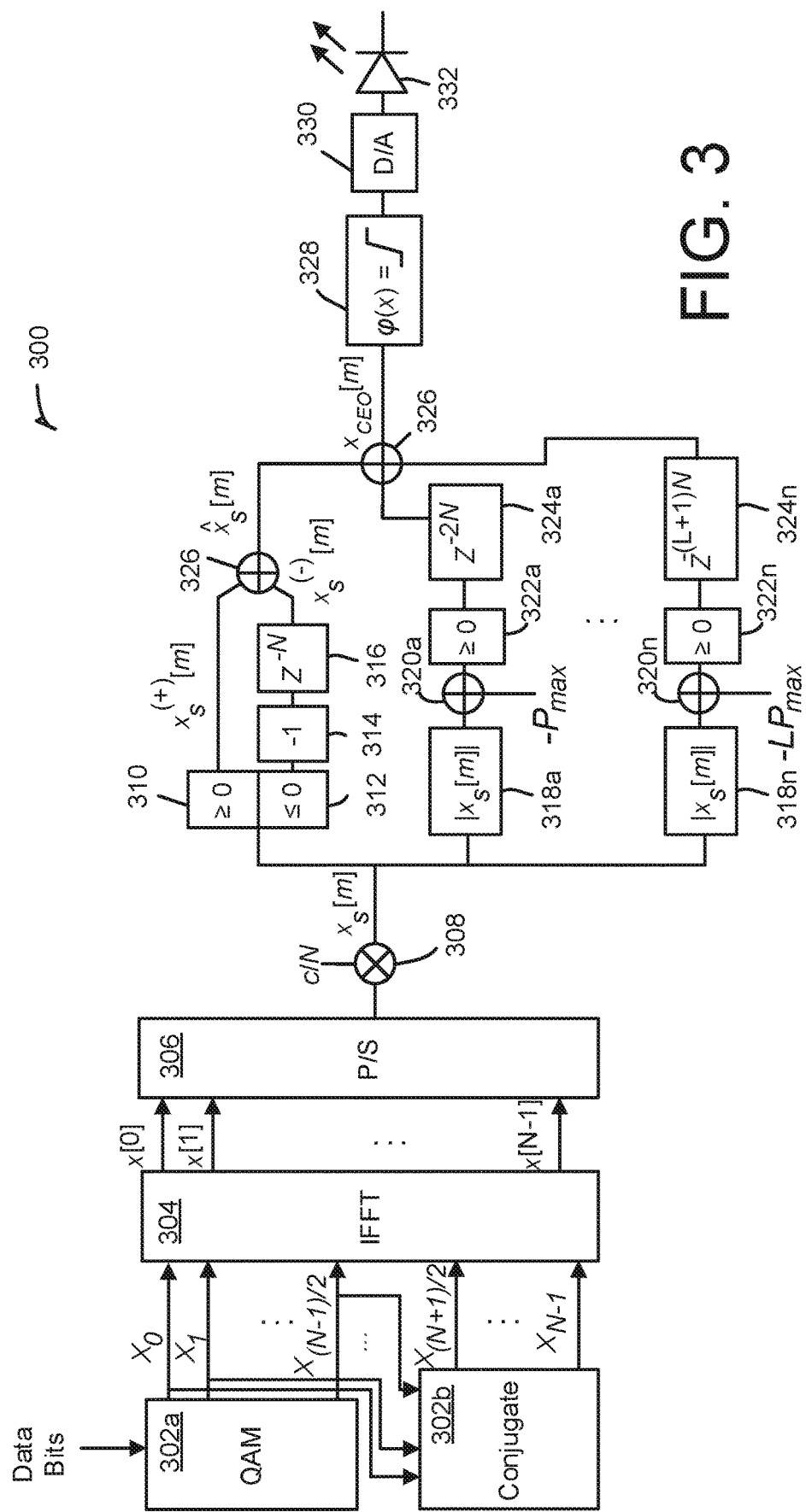
FIG. 3 is a block diagram illustrating an example transmitter for use in a clipping-enhanced OFDM system.

FIG. 3 is a block diagram illustrating an example transmitter 300 for use in an optical clipping-enhanced OFDM system to transmit signals such as those illustrated in FIGS. 2A and 2B. Transmitter 300 includes modulation circuit 302a, conjugate circuit 302b, inverse Fast Fourier Transform (IFFT) circuit 304, parallel-to-serial converter 306, signal scaler 308, diode circuits 310 and 312, inverter 314, delay circuit 316, absolute value circuits 318a-318n, bias circuits 320a-320n, diode circuits 322a-322n, delay circuits 324a-324n, adders 326, clipping circuit 328, digital-to-analog converter 330, and light-emitting diode (LED) 332. While illustrated as an LED 334, the transmitting element can be any electro-optical device configured to output optical signals.

Modulation circuit 302a can be a quadrature amplitude modulation (QAM) circuit, for example, that receives digital data as input. Other examples can include other modulation schemes. The outputs of the modulation circuit 302a are N/2 signals in the frequency domain. Because the transmitted signals are real and non-negative, a conjugate circuit 302b is used to ensure the final output $x_{CEO}[m]$ is real. The conjugate circuit receives the outputs of the modulation circuit 302a and generates N/2 signals in the frequency domain that are each complex conjugates of a respective one of the outputs of the modulation circuit 302a. For the example illustrated in FIG. 3, $X_i$ is the complex conjugate of $X_{N-i}$.

IFFT circuit 304 is configured to transform the vector $(X_0, \ldots, X_{N-1})$ from the frequency domain to the time domain. The output $x[0] \ldots x[N-1]$ of the IFFT circuit 304 is the OFDM output signal for the data transmission in the time domain. The parallel-to-serial converter 306 converts the time domain signals $x[0] \ldots x[N-1]$ into a serial stream of signals. The signal scaler 308 uses the modulation index c/N to output a discrete signal $x_s[m]$ with the desired modulation index. The signals $x_s[m]$ are bipolar discrete signals similar to those illustrated for data transmission 100 of FIG. 1. The signals $x_s[m]$ include both positive and negative values, some of which may exceed the threshold $P_{MAX}$ that corresponds to the maximum output power of LED 334.

Several logical signals paths are used to generate the data transmission $x_{CEO}[m]$ from the signals $x_s[m]$. These logical signal paths can be implemented using any desired digital and/or analog components. The data transmission $x_{CEO}[m]$ can be in the form of the data transmission 200a or 200b of FIGS. 2A and 2B, for example. The first signal path generates the signals for time slot 1, an example of which is illustrated in FIGS. 2A and 2B. The first signal path includes the diode circuit 310 which can be any circuit configured to pass through signals of $x_s[m]$ that are greater than zero.

The second signal path is used to generate the signals for time slot 2, an example of which is illustrated in FIGS. 2A and 2B. The second signal path includes the diode circuit 314 which can be any circuit configured to pass through signals of $x_s[m]$ that are negative. The negative signals are inverted by the inverter circuit 312. The delay circuit 316 is configured to hold values until the second time slot arrives, essentially creating an N symbol delay. The logical transform component 316 can include any digital or analog storage elements configured to store the values for transmission during the second time slot. The adder 326 is configured to combine the outputs of the first and second signal paths to generate the serial output signal for the first two time slots of the data transmission.

The remaining signal paths are used to output the signals for time slots 3 through L+2 which are used to transmit the clipped information from original signals $x_s[m]$, as illustrated in FIGS. 2A and 2B. These signal paths include absolute value circuits 318a-318n, adders 320a-320n, diode circuits 322a-322n, and delay circuits 324a-324n, which are used to obtain any clipped information (values above the threshold $P_{MAX}$) for transmission during the time slots 3 through L+2. To obtain clipped information for time slots beyond the third, the threshold $P_{MAX}$ is multiplied by L. For example, for a fourth time slot, the threshold is multiplied by two in order to obtain clipped information for time signals transmitted during time slot 3.

The delay circuits 324a-324n are configured to store and hold values until the respective time slot arrives. The delay circuits 324a-324n can include any digital or analog storage elements configured to store the values for transmission during the respective time slot. The adder 328 is configured to combine the outputs of all signal paths to generate the serial discrete time domain output signal $X_{CEO}[m]$ for all signal paths of the data transmission. Clipping circuit 330 is used to clip any signals that are greater than the threshold $P_{MAX}$, which corresponds to the maximum output power of the LED 334. The digital-to-analog converter 332 is configured to convert the digital signals into an analog forward current for driving the LED 334 at a desired intensity.

The circuits illustrated in FIG. 3 can be implemented by one or more microprocessors, controllers, application specific integrated circuits (ASICs), field-programmable gate arrays (FPGAs), or any other digital or analog circuits.

Figure 4:
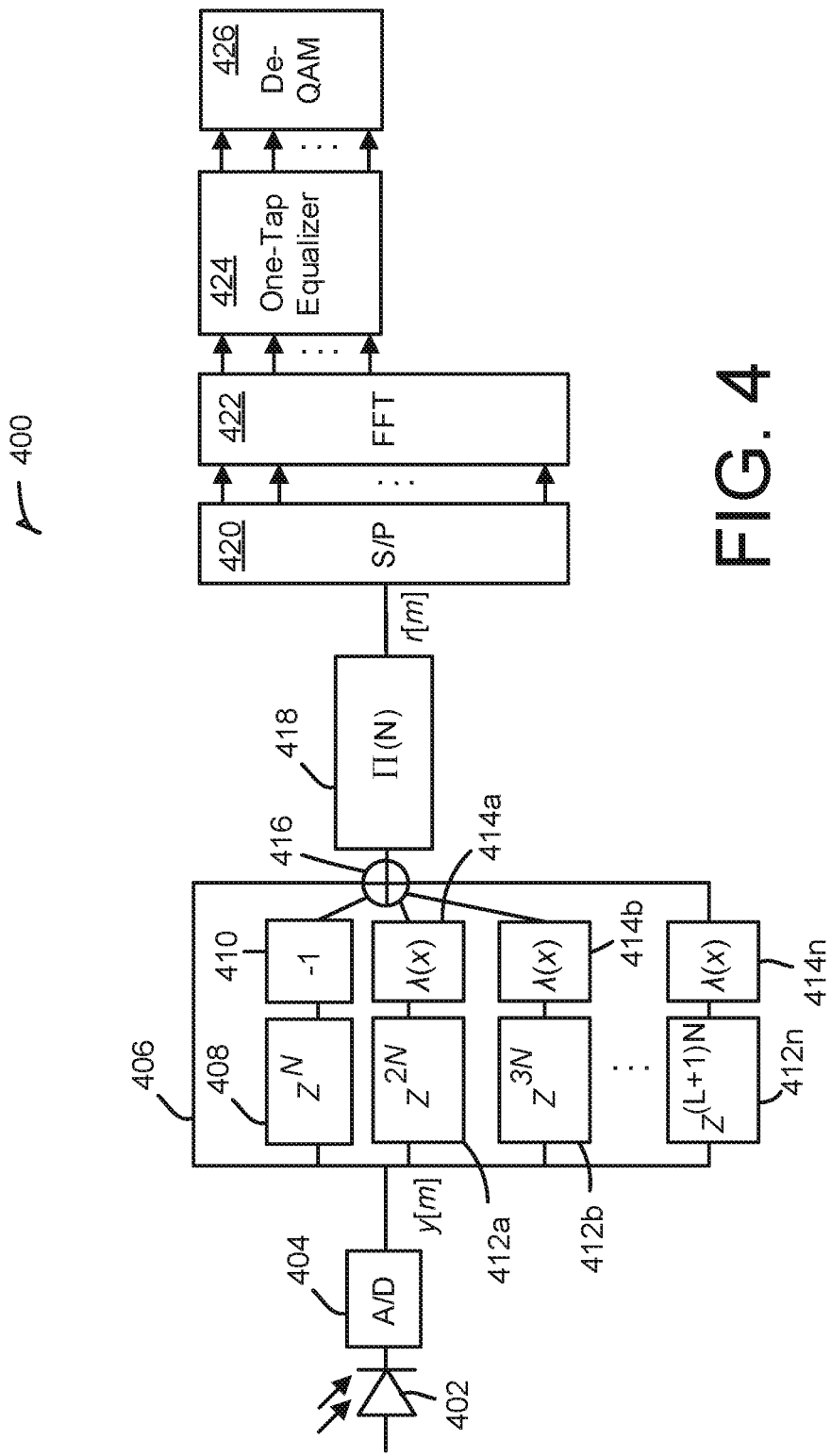
FIG. 4 is a block diagram illustrating an example receiver for use in a clipping-enhanced OFDM system.

FIG. 4 is a block diagram illustrating an example receiver 400 for use in a clipping-enhanced OFDM system to receive signals such as those illustrated in FIGS. 2A and 2B and transmitted by the transmitter 300 illustrated in FIG. 3. The receiver 400 includes a photodetector 402, an analog-to-digital converter 404, signal path 406, delay circuit 408, inverter 410, delay circuits 412a-412n, signum function circuits 414a-414n, adder 416, windowing circuit 418, serial-to-parallel convertor 420, fast Fourier transform circuit (FFT) circuit 422, one-tap equalizer circuit 424, and demodulation circuit 426. The signals from the LED 332 (FIG. 3) are received by the photodetector 402 and converted to digital signals using the analog-to-digital converter 404. Further analog and/or digital circuit components including filters, amplifiers, and/or other components can be included in the receiver 400.

The time domain signal from the transmitter 300 is reconstructed using several logical signal paths. Any number of digital and/or analog components can be used to implement the logical components for the several signal paths illustrated in FIG. 4. The first signal path 406 just passes the received signal through to the adder 416 and is representative of handling the positive portion of the original time domain signal transmitted during time slot 1 of the transmitter 300.

The second signal path includes the delay circuit 408 and the inverter 410. The delay circuit 408 represents that signals from the second time slot are passed to the inverter 410 to invert the signals to recover the original negative information. The remaining signal paths include delay circuits 412a-412n and the signum function circuits 414a-414n. The delay circuits 412a-412n represent that signals from the respective third through L+2 time slots are passed to the signum function circuits 414a-414n. The signum function circuits 414a-414n are configured to output a signal representing the clipped information that was transmitted during the respective time slot. The windowing 418 then takes the signals from the adder 416 and reconstructs the signals into a serial discrete time-domain frame of length N denoted r[m], which corresponds to the original serial time domain signal $x_s[m]$ in FIG. 3.

The serial-to-parallel circuit 420 converts r[m] into several parallel time domain signals. The FFT circuit 422 converts the time domain signals into frequency domain signals. The one-tap equalizer 424 can be applied to each frequency domain subcarrier from the FFT circuit 422 to compensate any phase distortion caused by a dispersive channel, for example. The demodulation circuit 426 is configured to convert the frequency domain signals into data bits to recover the originally encoded and transmitted digital data.

The circuits illustrated in FIG. 4 can be implemented by one or more microprocessors, controllers, application specific integrated circuits (ASICs), field-programmable gate arrays (FPGAs), or any other digital or analog circuits.

Figure 5:
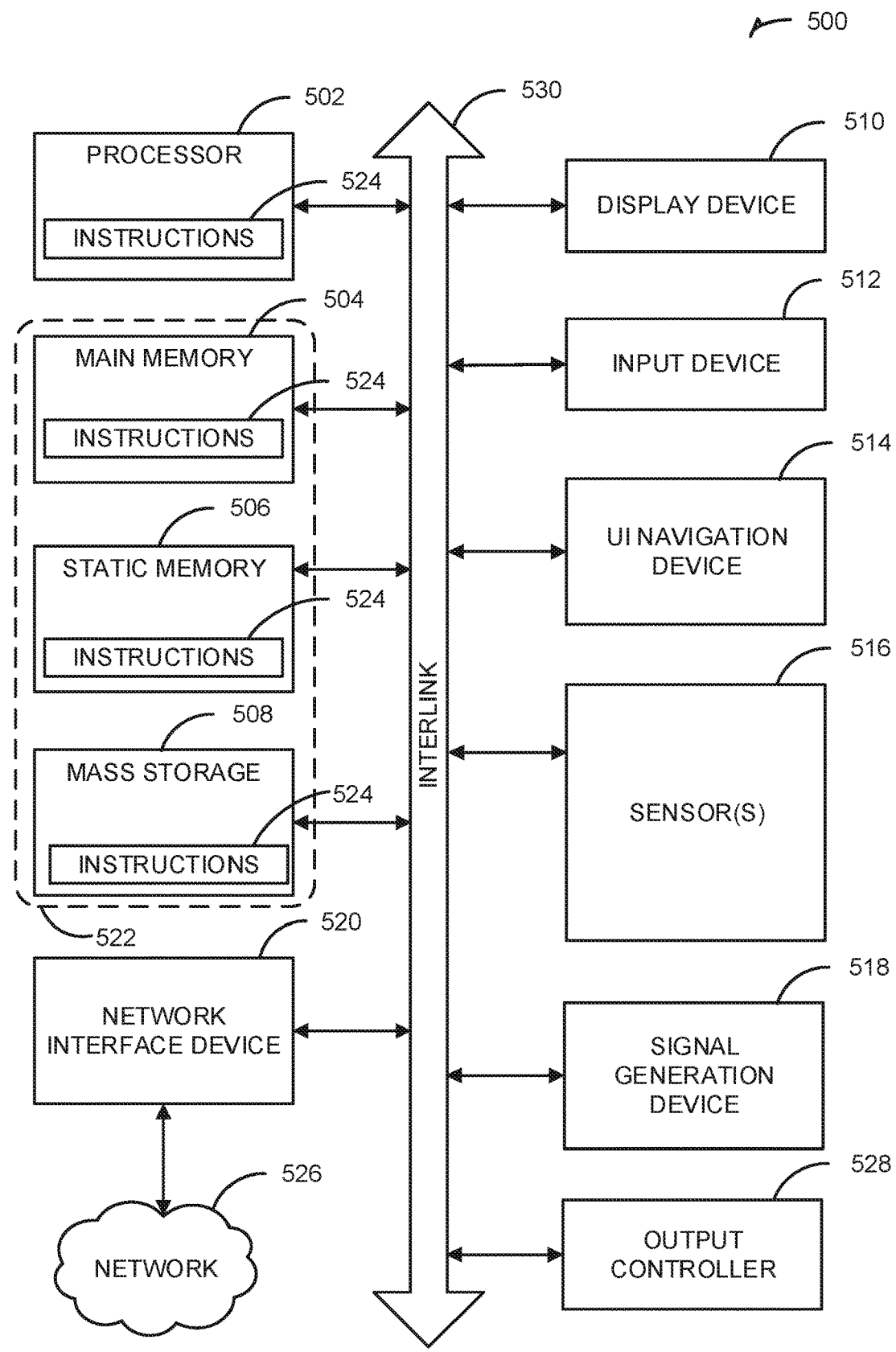
FIG. 5 is a block diagram illustrating an example of a machine upon which one or more embodiments may be implemented.

FIG. 5 illustrates a block diagram of an example machine 500 upon which any one or more of components of the transmitter 300 or receiver 400 can be implemented, or that can provide digital data to the transmitter 300 and receive digital data from the receiver 400. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE) device such as a tablet PC, a set-top box (STB), a personal digital assistant (PDA), a mobile telephone, or a network side device such as a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a visible light communication (VLC) network, local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi, IEEE 802.16 family of standards known as WiMax®, IEEE 802.15.4 family of standards, peer-to-peer (P2P) networks, among others). In an example, the network interface device 520 may include one or more light sources, photodetectors, physical jacks (e.g., Ethernet, coaxial, or phone jacks) or one or more antennas to connect to the communications network 526. In an example, the network interface device 520 may include light sources and photodetectors to optically communicate. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of communication of digital data, the method comprising:
    receiving a plurality of data bits to be transmitted; and
    generating an output signal for transmission by a transmitter circuit, the generating the output signal comprising:
        generating a portion of the output signal comprising values of the output signal with magnitude less than a specified threshold, including generating, during a first time slot, a positive signal portion that comprises values of the output signal that are greater than or equal to zero; and generating, during a second time slot, a negative signal portion that comprises inverted values of the output signal that are less than zero; and
        generating a second portion of the output signal comprising a representation of values of the output signal with magnitude greater than the specified threshold, wherein the specified threshold corresponds to a specified transmitter circuit maximum output power.

2. The method of claim 1, wherein generating the second portion of the output signal includes generating, during a third time slot, a clipped portion of the output signal that is greater than the specified transmitter circuit maximum output power.

3. The method of claim 1, wherein the transmitter circuit comprises an electro-optical device configured to output an optical signal corresponding to the output signal.

4. The method of claim 1, wherein generating the output signal comprises:
generating, using quadrature amplitude modulation, symbols corresponding to the plurality of data bits in the frequency domain; and
converting, using an inverse fast Fourier transform, the symbols into a discrete-time representation.

5. The method of claim 4, wherein generating, using the quadrature amplitude modulation, the symbols comprises:
generating, using the quadrature amplitude modulation, a first subset of the symbols; and
generating a second subset of symbols using the first subset of symbols, wherein the second subset of the symbols are complex conjugates of the first subset of the symbols.

6. The method of claim 1, wherein the second portion comprises values that correspond to values of both the positive signal portion and the negative signal portion that have magnitude greater than the specified threshold.

7. The method of claim 1, wherein generating the second portion of the output signal comprising a representation of values of the output signal with magnitude greater than the specified threshold comprises:
generating, during a third time slot, a first clipped portion of the second portion that corresponds to the values of the output signal that have magnitude greater than the specified threshold; and
generating, during a fourth time slot, a second clipped portion of the second portion that corresponds to values of the first clipped portion that have magnitude greater than the specified threshold.

8. A system for communication of digital data, the system comprising:
a transmitter circuit configured to receive a plurality of data bits and generate an output signal for transmission, the transmitter configured to:
generate a portion of the output signal comprising values of the output signal with magnitude less than a specified threshold, including generate, during a first time slot, a positive signal portion that comprises values of the output signal that are greater than or equal to zero; and generate, during a second slot, a negative signal portion that comprises inverted values of the output signal that are less than zero; and
generate a second portion of the output signal comprising a representation of values of the output signal with magnitude greater than the specified threshold, wherein the specified threshold corresponds to a specified transmitter circuit maximum output power; and
a receiver configured to receive the output signal and generate the plurality of data bits from the output signal.

9. The system of claim 8, wherein transmitter is configured to generate, during a third time slot, a clipped portion of the output signal that is greater than the specified transmitter circuit maximum output power.

10. The system of claim 9, wherein the transmitter circuit comprises an electro-optical device configured to output an optical signal corresponding to the output signal.

11. The system of claim 9, wherein the transmitter circuit is further configured to:
generate, using quadrature amplitude modulation, symbols corresponding to the plurality of data bits in the frequency domain; and
convert, using an inverse fast Fourier transform, the symbols into a discrete-time representation.

12. The system of claim 11, wherein the transmitter circuit is further configured to:
generate, using the quadrature amplitude modulation, a first subset of the symbols; and
generate a second subset of symbols using the first subset of symbols, wherein the second subset of the symbols are complex conjugates of the first subset of the symbols.

13. The system of claim 8, wherein the second portion comprises values that correspond to values of both the positive signal portion and the negative signal portion that have magnitude greater than the specified threshold.

14. The system of claim 8, wherein the transmitter circuit is further configured to:
generate, during a third time slot, a first clipped portion of the second portion that corresponds to the values of the output signal that have magnitude greater than the specified threshold; and
generate, during a fourth time slot, a second clipped portion of the second portion that corresponds to values of the first clipped portion that have magnitude greater than the specified threshold.

15. A transmitter configured to communicate digital data for a receiver, the transmitter comprising:
a transmitting element; and
a circuit configured to:
receive a plurality of data bits and generate an output signal for transmission;
generate a portion of the output signal comprising values of the output signal with magnitude less than a specified threshold, including generate, during a first time slot, a positive signal portion that comprises values of the output signal that are greater than or equal to zero; and generate, during a second slot, a negative signal portion that comprises inverted values of the output signal that are less than zero; and
generate a second portion of the output signal comprising a representation of values of the output signal with magnitude greater than the specified threshold, wherein the specified threshold corresponds to a specified transmitter circuit maximum output power.

16. The transmitter of claim 1, wherein the circuit is configured to generate, during a third time slot, a clipped portion of the output signal that is greater than the specified transmitter circuit maximum power.

17. The transmitter of claim 15, wherein the transmitting element comprises an electro-optical device configured to output an optical signal corresponding to the output signal.

18. The transmitter of claim 17, wherein the circuit is further configured to:
generate, using quadrature amplitude modulation, symbols corresponding to the plurality of data bits in the frequency domain; and
convert, using an inverse fast Fourier transform, the symbols into a discrete-time representation.

19. The transmitter of claim 15, wherein the circuit is further configured to:
generate, using the quadrature amplitude modulation, a first subset of the symbols; and generate a second subset of symbols using the first subset of symbols, wherein the second subset of the symbols are complex conjugates of the first subset of the symbols.

20. The transmitter of claim 15, wherein the circuit is further configured to:
generate, during a third time slot, a first clipped portion of the second portion that corresponds to the values of the output signal that have magnitude greater than the specified threshold; and
generate, during a fourth time slot, a second clipped portion of the second portion that corresponds to values of the first clipped portion that have magnitude greater than the specified threshold.

\* \* \* \* \*